United States Patent
Bittner et al.

(10) Patent No.: US 7,267,214 B2
(45) Date of Patent: Sep. 11, 2007

(54) ELECTROMAGNETIC FRICTIONALLY ENGAGED CLUTCH AND METHOD FOR OPERATING THE SAME

(75) Inventors: Eric Bittner, München (DE); Thomas Humez, Dachau (DE); Stephan Schachtl, München (DE); Holger Zang, Dachau (DE); Alexander De Jong, Machtenstein (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 37 days.

(21) Appl. No.: 10/516,363

(22) PCT Filed: May 27, 2003

(86) PCT No.: PCT/EP03/50199

§ 371 (c)(1),
(2), (4) Date: Dec. 1, 2004

(87) PCT Pub. No.: WO03/104671

PCT Pub. Date: Dec. 18, 2003

(65) Prior Publication Data

US 2005/0173219 A1 Aug. 11, 2005

(30) Foreign Application Priority Data

Jun. 10, 2002 (DE) ................................ 102 25 580

(51) Int. Cl.
*F16D 27/01* (2006.01)

(52) U.S. Cl. ...................................... 192/84.31; 49/349

(58) Field of Classification Search ............... 192/84.31
See application file for complete search history.

(56) References Cited

U.S. PATENT DOCUMENTS

| | | | | |
|---|---|---|---|---|
| 2,886,149 A | * | 5/1959 | Baermann | 192/84.31 |
| 2,956,658 A | * | 10/1960 | Jaeschke | 192/84.31 |
| 3,055,470 A | * | 9/1962 | Pierce | 192/84.31 |
| 3,263,784 A | | 8/1966 | Pierce | |
| 3,899,061 A | * | 8/1975 | Krug | 192/84.31 |
| 4,121,382 A | * | 10/1978 | Dietrich et al. | 49/334 |
| 4,126,215 A | * | 11/1978 | Puro | 192/84.961 |
| 4,496,922 A | * | 1/1985 | Pardee | 192/84.31 |
| 5,739,605 A | | 4/1998 | Lazorchak | |

FOREIGN PATENT DOCUMENTS

EP  0 793 034 A  9/1997

OTHER PUBLICATIONS

Abstract for JP 11301271, Nov. 2, 1999, Kawanobe et al.

* cited by examiner

*Primary Examiner*—Rodney H. Bonck
(74) *Attorney, Agent, or Firm*—Berenato, White and Stavish

(57) ABSTRACT

An electromagnetic frictionally engaged clutch for arranging inside a drive train connecting a drive motor and a vehicle door or flap. The arrangement ensures that the vehicle door is securely held in each intermediate position, when the clutch is in an idle state, while maintaining the possibility of a manual emergency actuation of the vehicle door. The rotor includes at least one permanent magnet in addition to the electric coil, such that when a current does not pass through the coil, the armature disk is pressed against the friction lining of the rotor, with a force which is strong enough for the vehicle door or vehicle flap to securely remain in position occupied when the clutch is an idle state, and for the friction engagement between the armature disk and the friction lining to be overcome when the vehicle door or vehicle flap is subsequently manually actuated.

10 Claims, 2 Drawing Sheets

ELECTROMAGNETIC FRICTIONALLY ENGAGED CLUTCH AND METHOD FOR OPERATING THE SAME

Figure 1:
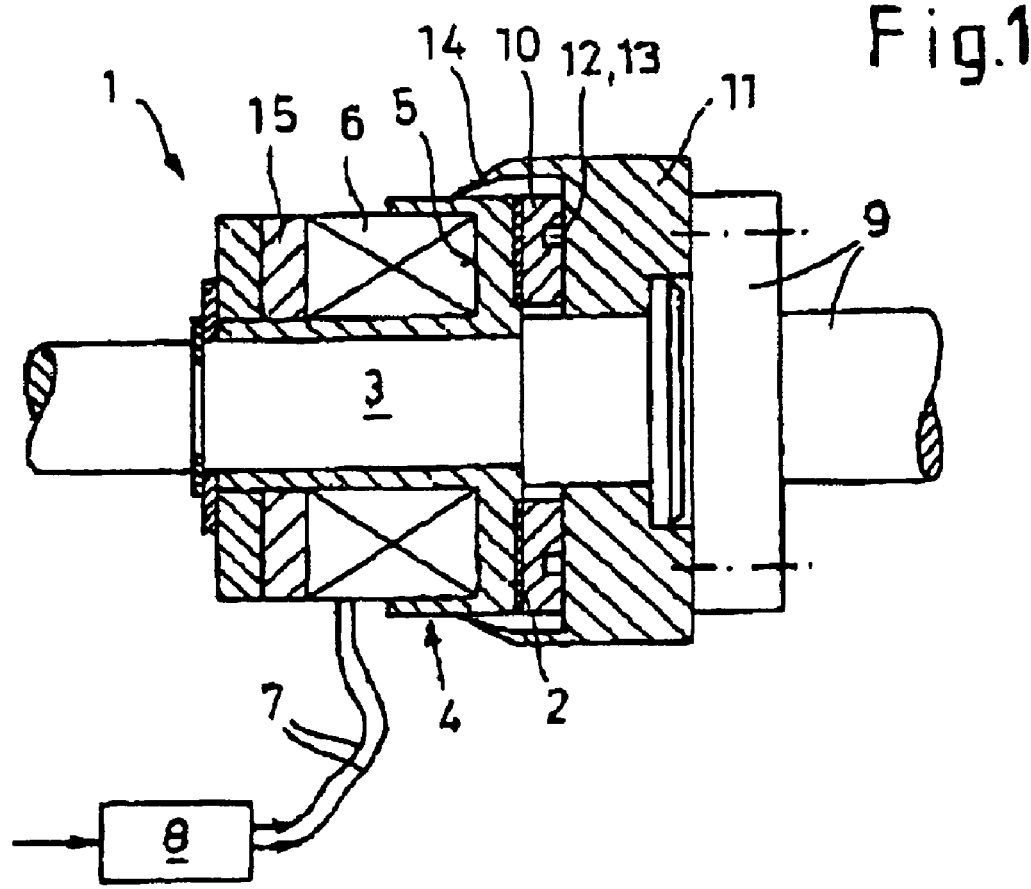

The invention relates to an electromagnetic frictionally engaged clutch to be arranged within a drive train connecting a drive motor and a vehicle door or a vehicle flap (tailgate, hood, etc.). The invention relates further to a method for operating such a clutch.

In motor vehicles having a vehicle door or vehicle flap which can be operated automatically (in the following text, also designated only a vehicle door for short), the vehicle door is closed or opened, for example by the driver of the vehicle, by means of an appropriate operation of a switch provided in the instrument panel. For this purpose, the switching signal generated by the switch acts on an electronic control device which, in turn, generates electric control signals for the activation of an electric motor which then, for its part, pivots or displaces the vehicle door via a gear mechanism and further transmission elements connected downstream.

The disadvantage in the case of these known motor vehicles is, inter alia, that when the vehicle door is pushed to manually, a high resistance has to be overcome because of the gear mechanism and electric motor operatively connected to the vehicle door, and increased wear of these components occurs.

In order to avoid wear of this type, a vehicle door which can be operated automatically has already been proposed, in which the motor or the gear mechanism connected downstream of the motor can be uncoupled from the drive shaft operating the vehicle door by means of an electromagnetic clutch, so that, when the clutch is disengaged, manual operation of the vehicle door is possible without its movement being inhibited by the structural units (for example electric motor or intermediate gear mechanism) arranged on the drive shaft of the clutch.

Electromagnetic clutches of this type are generally constructed as frictionally engaged clutches and therefore comprise a rotor part which is provided with a friction lining and firmly connected to a first shaft so as to rotate with it and on which, on its side facing away from the friction lining, an electric coil is arranged, and an armature disk which is firmly connected to a second shaft so as to rotate with it but be axially displaceable and which, when the clutch is engaged, is pulled against the friction lining of the rotor part of the first shaft and produces a frictional connection between the two shafts. When the clutch is disengaged, the armature disk and the rotor part are forced apart by means of a spring, so that there is an accurately predefined gap-like distance between armature disk and friction lining.

These clutches therefore have the disadvantage that, in the nonenergized state, because of the disengaged clutch, the vehicle door can be moved easily and is frequently subjected in an uncontrolled manner to forces acting on it (the force of gravity, springs of the suspension, dampers, etc.) when it is in an intermediate position between the closed and the open position. Given the presence of an appropriately strong spring, tailgates are generally pivoted from the intermediate position into the open end position after the clutch has been disengaged, although the vehicle door is frequently intended to remain in the respective intermediate position for safety reasons.

In German patent application number 101 52 697.0, which is not a prior publication, a clutch has already been proposed by means of which the vehicle door can be held securely in any intermediate position when the clutch is in its disengaged state, and by means of which emergency manual operation of the vehicle door is also possible. For this purpose, a resilient element, for example a compression spring, is provided, which acts on the armature disk of the clutch in the axial direction in such a way that, when the clutch is disengaged, the armature disk is pressed against the friction lining of the rotor part with a force which is sufficiently high for the vehicle door to remain securely in the respective position assumed when the clutch is disengaged. On the other hand, in the event of subsequent manual operation of the vehicle door, it should be possible for the frictional connection between armature disk and friction lining to be overcome.

In the case of this clutch, it has proven to be disadvantageous that the expenditure of a relatively great amount of force is necessary for the manual operation of the vehicle door.

The invention is based on the object of specifying an electromagnetic frictionally engaged clutch in which the vehicle door is held securely in any intermediate position when the clutch is in its disengaged state, and which permits both emergency manual operation with the expenditure of force and operation of the vehicle door with only little manual expenditure of force. Furthermore, a method for operating a clutch of this type is to be specified.

The invention is based substantially on the idea of providing a permanent magnet which acts on the armature disk of the clutch in the axial direction in such a way that, when the clutch is disengaged, the armature disk is pressed against the friction lining of the rotor part with a force which is high enough for the vehicle door to remain securely in the respective position assumed when the clutch is disengaged and that, in the event of subsequent manual operation of the vehicle door, the frictional connection between armature disk and friction lining can be overcome. In order to permit relatively easy manual operation of the vehicle door, current is applied to the coil in such a way that its magnetic field is opposed to the magnetic field of the permanent magnet and the vehicle door can thus be moved by hand with virtually no force.

It has proven to be advantageous if the armature disk is acted on in the axial direction and pressed against the friction lining of the rotor part by at least one resilient element (compression spring, disk spring, corrugated disk, rubber buffer, etc.) in addition to the magnetic force of the permanent magnet.

In order to ensure a rotationally firm connection between armature disk and armature disk carrier with the simultaneous ability of the armature disk to be displaced axially, the armature disk carrier comprises axial guide parts which engage in corresponding groove-like recesses in the armature disk.

Furthermore, it has proven to be expedient if, on its side facing away from the friction lining, the rotor part has a recess in which the coil is at least partly arranged, the coil being mounted fixed to the housing.

On its side facing the rotor part, the armature disk carrier can have a sealing lip which extends over the entire circumference and protects the friction lining of the rotor part against lubricants entering. Of course, however, other seals, such as O-ings or felt parts, can also be used.

With the clutch according to the invention, it is possible in a straightforward manner to predefine a "transmission torque curve", that is to say the clutch can implement different transmission torques in different positions of the vehicle door, by means of predefining an appropriate voltage or current profile.

Figure 2:
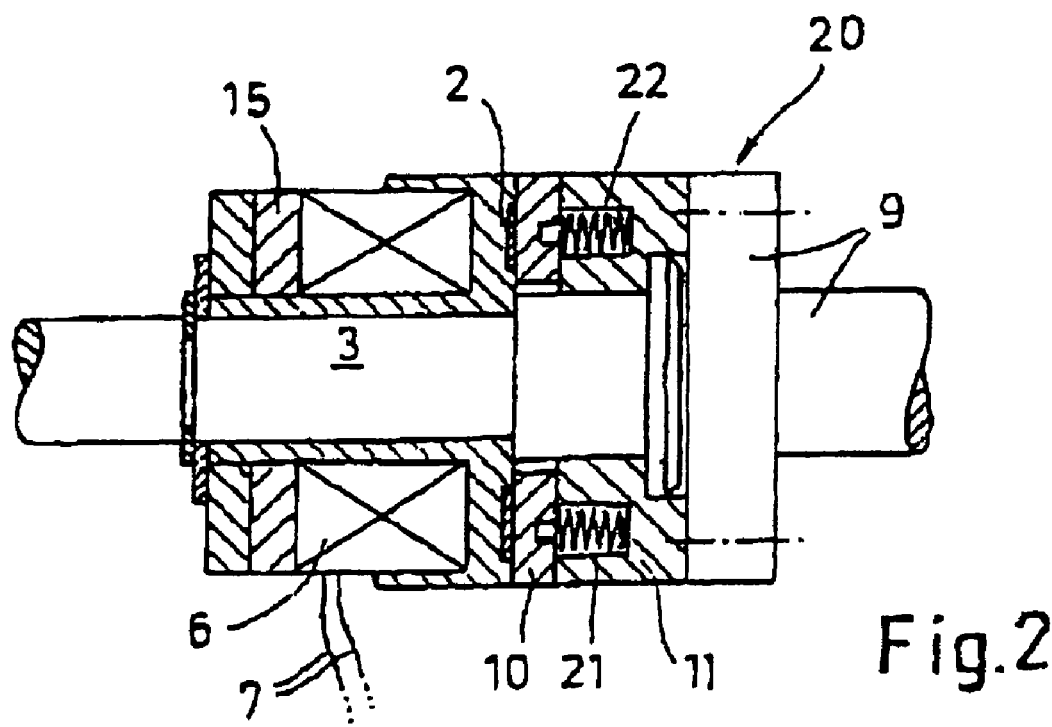
Figure 3:
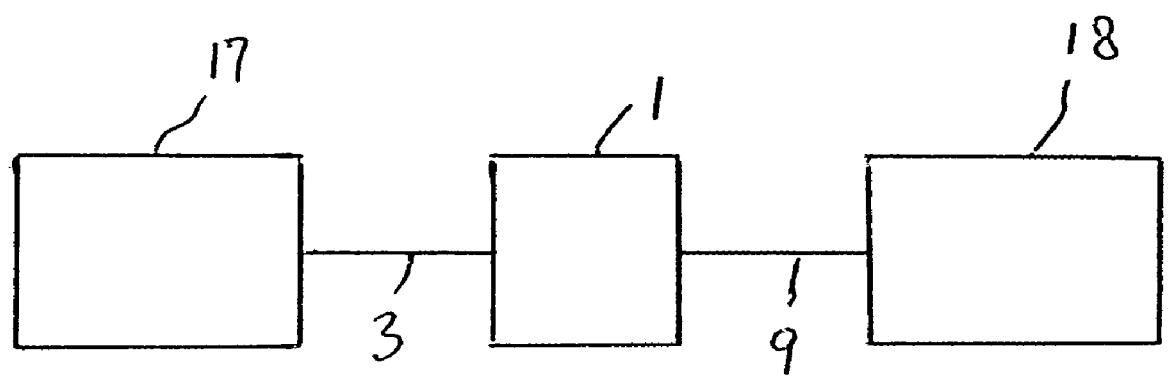

Further details and advantages of the invention emerge from the following exemplary embodiments, explained by using figures, in which:

FIG. 1 shows a first exemplary embodiment of a clutch according to the invention in a side view illustrated schematically, partly in section, and FIG. 2 shows a further exemplary embodiment, corresponding to FIG. 1, of a clutch according to the invention with spring assistance, and FIG. 3 is a schematic view of a drive train connecting a drive motor and a vehicle door selectively driven by the drive motor.

In FIG. 1 an electromagnetic frictionally engaged clutch is designated by 1, being arranged within a drive train between a drive motor 17, illustrated in FIG. 3, and a tailgate, or a vehicle door) 18, also illustrated in FIG. 3, of a motor vehicle.

The clutch 1 comprises a rotor part 4 which is provided with a friction lining 2 and firmly connected to a first shaft 3 so as to rotate with it (for example the drive shaft connected to the drive motor 17), which, on its side facing away from the friction lining 2, has a recess 5 in which an electric coil 6 is mounted fixed to the housing. The coil 6 is connected to an electric control device 8 by electric leads 7.

The clutch 1 also has an armature disk 10 which is firmly connected to a second shaft 9 (output shaft) so as to rotate with it but be axially displaceable. For this purpose, the second shaft 9 is firmly connected to an armature disk carrier 11, which comprises axial guide parts 12 which engage in corresponding groove-like recesses 13 in the armature disk 10.

On its side facing the rotor part 4, the armature disk carrier 11 has a sealing lip 14 which extends over the entire circumference, covers the friction lining 2 of the rotor part 4 completely and prevents lubricants being able to penetrate into this region.

Arranged on the rotor part 4, parallel to the electric coil 6, is a permanent magnet 15, which produces a magnetic field strength which is selected such that, when the coil 6 is not energized, the armature disk 10 is pressed against the friction lining 2 with a predefined force and the tailgate 18 remains in the respective position assumed when the clutch 1 is disengaged, on account of the frictional connection. However, it should be possible for the frictional connection between armature disk 10 and friction lining 2 to be overcome during the subsequent manual operation (emergency operation) of the tailgate 18.

In the following text, the mode of action of the clutch 1 will be explained:

If the tailgate 18 (illustrated in FIG. 3) is to be opened, for example, the electric coil 6 is energized by the control device 8. As a result, the magnetic force of the permanent magnet 15 is increased. If the first shaft 3 is then driven by the drive motor 17, then the second shaft 9 is carried along by the clutch 1 and operates the tailgate 18, illustrated in FIG. 3.

If, before reaching its end position, the tailgate 18 is to be stopped in a predefined angular position, then the supply of current to the coil 6 is interrupted by the control device 8. On account of the magnetic force of the permanent magnet 15, a frictional torque remains between the friction lining 2 and the armature disk 10 and ensures that the tailgate 18 remains securely in its assumed position. By means of appropriately powerful manual operation of the tailgate 18, the latter can then be closed again or opened completely (emergency operation, for example in the event of failure of the power supply).

On the other hand, if the tailgate is to be operated manually from a predefined position without the expenditure of great force, the electric coil 6 is energized again, the direction of the current being selected such that the magnetic field produced weakens the magnetic field of the permanent magnet 15 and the tailgate can be actuated by hand with virtually no force.

Of course, the invention is not restricted to the exemplary embodiment described above. For example, in order to assist the permanent magnet 15, a resilient element can additionally be provided which presses the armature disk 10 against the rotor part 4 when the coil 6 is not energized.

A corresponding exemplary embodiment of a clutch 20 of this type is illustrated in FIG. 2. In this case, the resilient elements (helical compression springs) designated by 21 are arranged in corresponding blind drilled holes 22 in the armature disk 10. Otherwise, the construction of this clutch 20 corresponds to the construction of the clutch 1 explained above by using FIG. 1.

LIST OF DESIGNATIONS

1 Clutch
2 Friction lining
3 First shaft
4 Rotor part
5 Recess
6 Electric coil, coil
7 Electric lead
8 Control device
9 Second shaft
10 Armature disk
11 Armature disk carrier
12 Guide part
13 Recess
14 Sealing lip
15 Permanent magnet
17 Drive motor
18 Vehicle door, such as a tailgate
20 Clutch
21 Resilient element, compression spring
22 Blind drilled hole

The invention claimed is:

1. An electromagnetic friction clutch (1; 20) in a drive train connecting a drive motor and a vehicle door selectively driven by the drive motor between open and closed positions the clutch comprising:

a rotor part (4) provided with a friction lining (2) and drivingly connected to a first shaft (3) so as to rotate therewith;

an electric coil (6) arranged on a side of the rotor part (4) facing away from the friction lining (2), and an armature disk (10) drivingly connected to a second shaft (9) so as to rotate therewith axially movable relative to the second shaft (9);

at least one permanent magnet (15) arranged on the rotor part (4), the at least one permanent magnet (15) having a magnetic force such that the armature disk (10) is pressed against the friction lining (2) of the rotor part (4) with a friction force which is high enough for the vehicle door to remain securely in the open position assumed when the electric coil (6) is not energized and such that, during subsequent manual operation of the vehicle door, the frictional connection between armature disk (10) and friction lining (2) can be overcome.

2. The clutch as claimed in claim 1, further including at least one resilient element (21) biasing the armature disk (10) toward the rotor part (4) in such a way that, when the electric coil (6) is not energized, the armature disk (10) is pressed by the permanent magnet (15) and the resilient element (21) against the friction lining (2) of the rotor part (4) with a force which is high enough for the vehicle door to remain securely in the respective position assumed when the clutch (20) is disengaged and, during subsequent manual operation of the vehicle door, the frictional connection between armature disk (10) and friction lining (2) can be overcome.

3. The clutch as claimed in claim 2, wherein the resilient element (21) is one of a compression spring, a disk spring, a corrugated disk and a rubber buffer.

4. The clutch as claimed in claim 1, wherein the second shaft (9) is drivingly connected on the outside to an armature disk carrier (11) so as to rotate therewith, the armature disk carrier (11 comprises axial guide parts (12) which engage corresponding groove-like recesses (13) in the armature disk (10).

5. The clutch as claimed in claim 4, wherein one of the second shaft (9) and the armature disk carrier (11) contains at least one open blind drilled hole (22) on the side facing the armature disk (10) in order to accommodate the at least one resilient element (21).

6. The clutch as claimed in claim 1, wherein, on its side facing away from the friction lining (2), the rotor part (4) has a recess (5) in which the coil (6) is at least partly arranged.

7. The clutch as claimed in claim 1, wherein the coil (6) is fixed to the rotor part (4).

8. The clutch as claimed in claim 4, wherein, on its side facing the rotor part (4), the armature disk carrier (11) has an annular sealing lip (14) completely covering the friction lining (2) of the rotor part (4).

9. The clutch as claimed in claim 1, wherein, in order to engage the clutch (1; 20), an electric current is applied to the electric coil (6) for creating a magnetic field oriented in the same direction as the magnetic field of the permanent magnet (15), so that the armature disk (10) is pressed firmly against the friction lining (2) of the rotor part (4), and wherein, in order to disengage the clutch (1; 20), the electric current is applied to the electric coil (6) for creating a magnetic field oriented in the opposite direction to the magnetic field of the permanent magnet (15), so that the armature disk (10) is not pressed or pressed only loosely against the friction lining (2) of the rotor part (4).

10. The clutch as claimed in claim 9, wherein the electric current applied to the electric coil (6) has a value dependent on the respective position of the vehicle door.

* * * * *